(12) United States Patent
Palmer et al.

(10) Patent No.: US 8,792,306 B2
(45) Date of Patent: Jul. 29, 2014

(54) APPARATUSES AND METHODS FOR ATTRACTING AQUATIC ANIMALS

(76) Inventors: Robert Harold Palmer, Little Elm, TX (US); Eugene Joseph Eisenmann, Jr., Frisco, TX (US)

( * ) Notice: Subject to any disclaimer, the term of this patent is extended or adjusted under 35 U.S.C. 154(b) by 483 days.

(21) Appl. No.: 13/027,031

(22) Filed: Feb. 14, 2011

(65) Prior Publication Data

US 2012/0204467 A1 Aug. 16, 2012

(51) Int. Cl.
*H04B 1/02* (2006.01)

(52) U.S. Cl.
USPC .............................. 367/139; 367/153; 367/174

(58) Field of Classification Search
USPC .................... 367/139–141, 153, 174; 43/17.1
See application file for complete search history.

(56) References Cited

U.S. PATENT DOCUMENTS

| | | | |
|---|---|---|---|
| 5,177,891 A * | 1/1993 | Holt | 43/17.1 |
| 5,282,178 A | 1/1994 | Hill et al. | |
| 5,883,858 A * | 3/1999 | Holt | 367/139 |
| 6,545,948 B1 | 4/2003 | Jiang | |
| 7,333,395 B2 | 2/2008 | Lewis et al. | |
| 2006/0268664 A1* | 11/2006 | Lewis et al. | 367/139 |

OTHER PUBLICATIONS

Biosonix Systems Marketing Brochure, "BSX Sound Technology the Power of Natural Sound", pp. 1-10.
Biosonix Systems Website, http://www.biosonix.com, Retrieved Feb. 11, 2011.
Biosonix Systems RF-300 Randy Flint Series User Guide, pp. 1-19, Retrieved Feb. 11, 2011.

* cited by examiner

*Primary Examiner* — Luke Ratcliffe (57) ABSTRACT

Apparatuses and methods for attracting aquatic animals are provided. In one embodiment, an apparatus for attracting aquatic animals includes a submersible speaker adapted to emit a pre-recorded sound for attracting an aquatic animal. The pre-recorded sound includes tactile sound. The apparatus also includes a controller in communication with the submersible speaker. The controller is adapted to be coupled to an above-water portion of a boat. The controller includes a user interface comprising one or more user-selectable options. The controller is adapted to send a signal to the submersible speaker in response to detecting a selection of one of the user-selectable options, and the submersible speaker emits the pre-recorded, sound in response to receiving the signal.

18 Claims, 7 Drawing Sheets

APPARATUSES AND METHODS FOR ATTRACTING AQUATIC ANIMALS

TECHNICAL FIELD

The illustrative embodiments relate generally to sound-emitting devices, and more particularly, to apparatuses and methods for attracting aquatic animals.

BACKGROUND

The tools that are available to fishermen to capture or catch higher numbers or different, types of aquatic animals, including fish, have increased over time. These tools are also becoming an important part of the various different types of fishing, including commercial fishing, recreational fishing, competitive fishing, etc. One particular tool or technique that may be used by fishermen to improve their success in catching or attracting aquatic animals involves the emission of sound in an underwater environment. However, currently existing sound emitting devices used by fishermen may be difficult to understand and operate, and may further fail to emit certain types of sound for the attraction of aquatic animals. These current systems may also lack certain features that limit their usefulness to fishermen.

SUMMARY

According to an illustrative embodiment, an apparatus for attracting aquatic animals includes a submersible speaker adapted to emit a pre-recorded sound for attracting an aquatic animal. The pre-recorded sound includes tactile sound. The apparatus also includes a controller in communication with the submersible speaker. The controller is adapted to be coupled to an above-water portion of a boat. The controller includes a user interface comprising one or more user-selectable options. The controller is adapted to send a signal to the submersible speaker in response to detecting a selection of one of the user-selectable options, and the submersible speaker emits the pre-recorded sound in response to receiving the signal.

According to another illustrative embodiment, an apparatus for attracting aquatic animals includes a submersible speaker housing and a submersible speaker housed within the submersible speaker housing. The submersible speaker is adapted to emit a pre-recorded sound for attracting an aquatic animal. The apparatus also includes a controller in communication with the submersible speaker. The controller is adapted to be coupled to an above-water portion of a boat. The controller includes a plurality of pre-recorded sounds playable in a plurality of pre-determined loop modes. The controller includes a user interface including one or more user-selectable options. The controller incrementally scrolls through the plurality of pre-determined loop modes for each of the plurality of pre-recorded sounds each time selection of a first option in the one or more user-selectable options is detected to identify the pre-recorded sound and one of the plurality of pre-determined loop modes. The controller is adapted to send a signal to the submersible speaker in response to detecting a selection of a second option in the one or more user-selectable options. Also, the submersible speaker emits the pre-recorded sound in accordance with the identified pre-determined loop mode in response to receiving the signal.

According to another illustrative embodiment, a method for attracting aquatic animals includes turning on a controller in response to detecting a user selection of a first button, determining a pre-recorded sound and a loop mode based on a number of times selection of the first button is detected, and playing the determined pre-recorded sound in accordance with the determined loop mode in response to detecting user selection of a second button.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore not to be taken in a limiting sense, and the scope of the illustrative embodiments are defined only by the appended claims.

Figure 1:
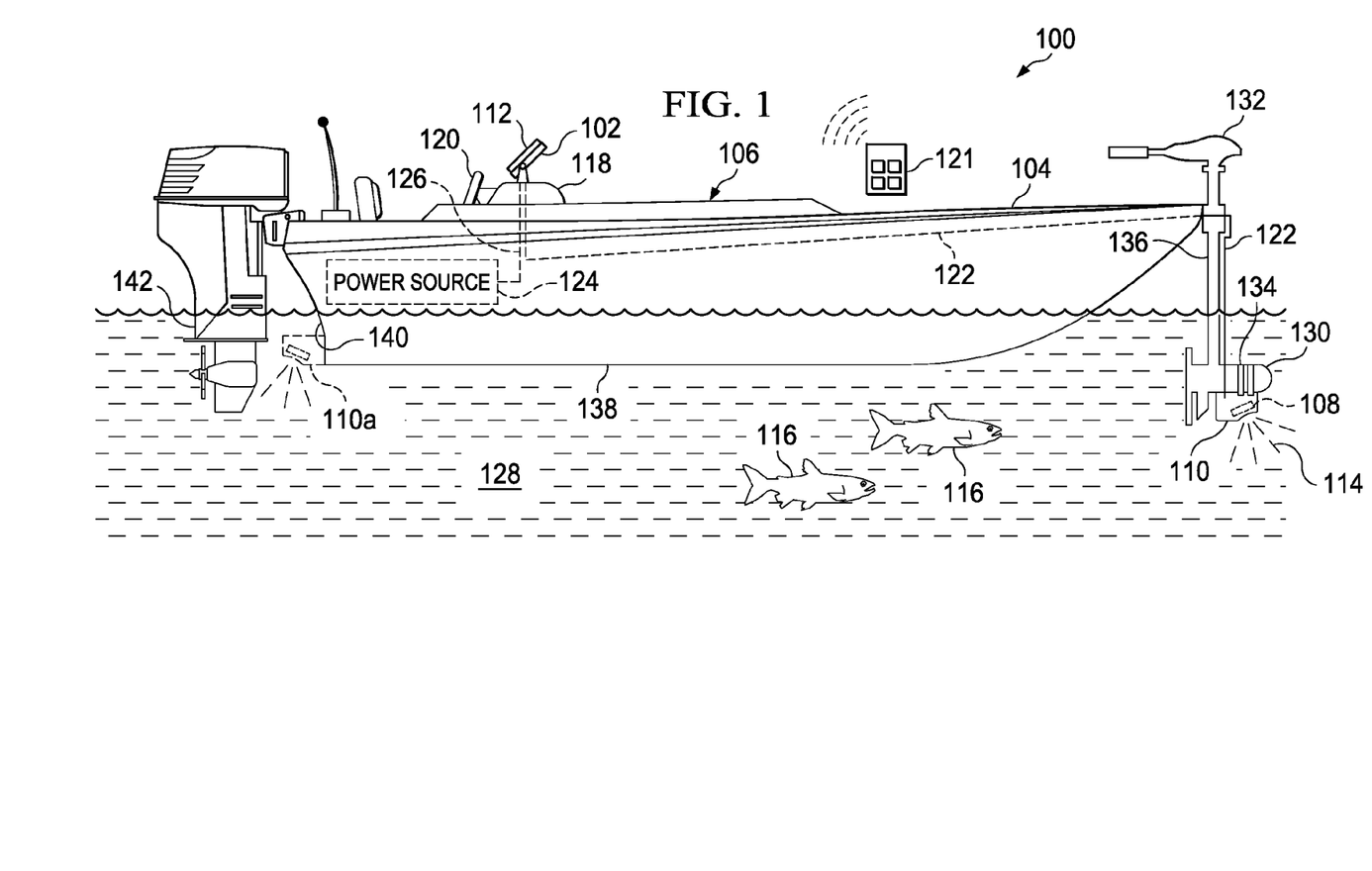
FIG. 1 is a schematic, pictorial representation of a system for attracting aquatic animals according to an illustrative embodiment.

Referring to FIG. 1, an illustrative embodiment of an aquatic animal-attracting system 100 includes a controller 102 coupled to an above-water portion 104 of a boat 106. The controller 102 may be in communication with a submersible speaker 108 fully or partially contained in a submersible speaker housing 110. Unless otherwise indicated, as used herein, "or" does not require mutual exclusivity. A passenger on the boat 106 may select one or more options on a user interface 112 of the controller 102 that causes the controller 102 to send a signal, or any other type of data, to the submersible speaker 108. In one embodiment, the controller 102 may include one or more pre-recorded sounds that are playable in one or more predetermined loop modes, and the user interface 112 of the controller 102 may include user-selectable options that allow a user to select and play one of the pre-recorded sounds in one of the predetermined loop modes. The submersible speaker 108, upon receiving the signal from the controller 102, may then emit a sound 114 for attracting one or more aquatic animals 116.

As used herein, the term "coupled" includes coupling via a separate object and includes direct coupling. The term "coupled" also encompasses two or more components that are continuous with one another by virtue of each of the components being formed from the same piece of material. Also, the term "coupled" may include chemical, such as via a chemical bond, mechanical, thermal, magnetic, or electrical coupling.

In the embodiment, the sound 114 that is playable by the submersible speaker 108 may include a pre-recorded sound stored on a memory of the controller 102, or stored, on a peripheral device in communication with the controller 102. As will be described in further detail below, the controller 102 may include any number of pre-recorded sounds that are playable in one or more loop modes, and the number of pre-recorded sounds and/or loop modes may be expanded by the addition of an insertable storage device.

The sound 114 may be any sound capable of attracting the aquatic animals 116, including the sound of an aquatic animal being eaten by predators, the sound of an attacking aquatic animal, the sound of an active or moving aquatic animal, or other types of aquatic animal-attracting sounds. The sound 114 may also include tactile sound, which may be sound in a frequency range from 1 to 800 Hz. In one embodiment, the tactile sound, which may be emitted by the speaker 108 or a tactile sound transducer, may stimulate the otoliths and/or the mechanosensory lateral line of the aquatic animals 116 to increase their feeding aggression. In one embodiment, speaker 108 itself includes a tactile sound transducer, although, in another embodiment, a tactile sound transducer may be included in the submersible speaker housing 110 that is separate from the speaker 108. In one embodiment, the tactile sound that may be emitted by the speaker 108 may cause kinesthetic sensations in the aquatic animals 116 from tactile sound waves moving through the water 128 and colliding with the otoliths and lateral-line of an aquatic animal 116. In another embodiment, the tactile sound may affect the aquatic animals 116 through haptic sensing, such as when the tactile sound activates the lateral line of the aquatic animal 116 to affect the aquatic animal 116 through its sense of touch.

The controller 102 may be mounted or coupled anywhere on the above-water portion 104 of the boat 106, including the gunnel, deck area, dash 118, cockpit, helm, or any other user-accessible portion of the boat 106. In another embodiment, the controller 102 may be integrated with another component of the boat 106, such as the steering wheel 120, dash 118, gunnel, etc. For example, the controller 102, or any portion thereof, may be integrated on the dashboard, as part of the instrument cluster, in the cockpit of the boat 106; in this example, one or more functions of the controller 102 may be included alongside, adjacent, or integrated with other instruments on the dashboard, such as fuel level, engine temperature, RPM, speed, battery current/voltage level, etc. In another example, one or more functions of the controller 102 may be integrated, or otherwise included, with another instrument, such as a fish finder, sonar graph, GPS module, sonar flasher, radar, side imaging unit, down imaging unit, mapping software or mapping unit, in-dash CD, mp3, or music player, or any other instrument or device that may be used on the boat 106 or by a fisherman. In yet another embodiment, the controller 102 may be implemented as an application on a mobile communication device, such as a cell phone, laptop, tablet computer, etc.

In one embodiment, the aquatic animal-attracting system 100 may include a remote control 121 that may communicate, wirelessly or otherwise, with the controller 102. The remote control 121 may control, or select, any one or more of the functions of the controller 102 described in the illustrative embodiments. In one embodiment, the remote control 121 may include all or a portion of the user-selectable options included on the controller 102. In the embodiment in which the remote control 121 communicates wirelessly with the controller 102, the communication may use any wireless communication standard or technique (e.g., Bluetooth, infrared diode, CDMA, etc.).

In yet another embodiment, the remote control 121 may be an application for a mobile communication device (e.g., cellular phone, laptop, tablet computer, etc.). For example, a user of the aquatic animal-attracting system 100 may download an application for his or her mobile communication device, and use the application on the mobile communication device to control the aquatic animal-attracting system 100, including the controller 102, upload sounds to the aquatic animal-attracting system 100, or communicate with any portion of the aquatic animal-attracting system 100. In one embodiment, the application may include all or a portion of the user-selectable options included on the controller 102. The mobile communication device may communicate with the aquatic animal-attracting system 100 in any manner, including using CDMA (e.g., cdmaOne or CDMA2000), GSM, 3G, 4G, Edge, an over-the-air network, Bluetooth, etc.

In one embodiment, the controller 102 may communicate with the submersible speaker 108 via a conduit or wire 122. The conduit 122 may transmit signals, or audio signals or other data, between the controller 102 and the submersible speaker 108, including the sending of signals from the controller 102 to the submersible speaker 108 to cause the submersible speaker 108 to emit sounds 114. In another embodiment, instead of using the conduit 122, the controller 102 may wirelessly communicate with the submersible speaker 108 to cause the submersible speaker 108 to emit the sounds 114.

The types of aquatic animals 116 for which the aquatic animal-attracting system 100 may be used are numerous. For example, the aquatic animals 116 may include fish (e.g., bass, catfish, red snapper, tuna, billfish, sailfish, marlin, swordfish, trout, salmon, etc.), molluscs, cephalopods, crustaceans, echinoderms, whales, dolphins, fresh water aquatic animals, salt water aquatic animals, etc.

In one embodiment, the controller 102 may receive electrical energy or power from a power source 124 located on the boat 106. The controller 102 may be electrically coupled to the power source 124 using an electrical conduit 126, or other connection type. Examples of the power source 124 from which the controller 102 may receive power are numerous. For example, the power source 124 may be a battery used by the boat 106 (e.g., a 12 volt battery); in this embodiment, the controller 102 may be electrically, or otherwise, coupled with the battery using terminal lines that connect to the battery. In another embodiment, the controller 102 may plug into the power source 124 via a cigarette lighter, or other plug outlet, located on the boat 106. In another embodiment, the power source 124 may be an alternator for the boat 106. In another example, the power source 124 may be one or more batteries, rechargeable or non-rechargeable, that are located within the controller 102 itself.

The submersible speaker 108 may point in any direction. In one embodiment, the speaker 108 is an omnidirectional speaker that is capable of emitting the sound 114 in multiple different directions simultaneously. In another embodiment, the submersible speaker 108 may have a tuned pathway for emitting the sound 114 in a particular direction. Also, in another embodiment, the submersible speaker housing 110 may include two or more speakers, each pointed in a different direction to emit the sounds 114 in multiple directions. Also, the submersible speaker 108, as well as the submersible speaker housing 110, may be partially or fully submerged in the water 128 when emitting the sound 114.

The submersible speaker housing 110, or, in another embodiment, the speaker 108 itself, may be coupled to the boat 106, or other peripheral device, in a variety of ways. In one embodiment, the submersible speaker housing 110 is coupled to a motor portion 130 of a trolling motor 132. The submersible speaker housing 110 may be coupled to the motor portion 130 of the trolling motor 132 using one or more straps 134 that may wrap around the motor portion 130. The submersible speaker housing 110 may be coupled to the motor portion 130 in alternative ways as well, including by the use of welding, screws, bolts, glue, magnets, brackets, wire, etc. In another embodiment, instead of being attached to the outside of a portion of the trolling motor 132, the speaker 108 may be integrated with any portion of the trolling motor 132, including the motor portion 130, the shaft 136, etc.; in this embodiment, the speaker 108 may be fully or partially countersunk, or integrated, into any portion of the trolling motor 132. When coupled to the motor portion 130 of the trolling motor 132, the submersible speaker housing 110 may be removed from the water 128 by removing the trolling motor 132 itself from the water 128. When a user desires to use the aquatic animal-attracting system 100, the user may submerge the motor portion 130 or the trolling motor 132 into the water 128. Also, the conduit 122 may be disposed adjacent, or abutting, a shaft 136 of the trolling motor 132, and may be coupled to the shaft 136 using a band, tie, snaps, etc.

In another embodiment, the submersible speaker housing 110 may be coupled to a submersible portion 138 of the boat 106. For example, an alternative location of the submersible speaker housing 110 is shown by the submersible speaker housing 110a. The submersible speaker housing 110a is coupled to a transom 140 of the boat 106. In yet another embodiment, the submersible speaker housing 110 may be coupled to a primary motor 142 of the boat 106.

In another embodiment, the submersible speaker housing 110 or the speaker 108 are not limited to being coupled to the boat 106 or the trolling motor 132. For example, the submersible speaker housing 110 or the speaker 108 may be suspended over the edge of the boat 106, or may be placed in the proximity of the boat 106. In another example, the submersible speaker housing 110 or the speaker 108 may be anchored, or otherwise located, at fixed or semi-fixed spots in a body of water, and a user on the boat 106 may communicate, wirelessly or otherwise, with the anchored speaker using the controller 102; thus, the user may utilize speakers at pre-determined locations using his or her controller 102. In one example, the user may move his or her boat near the location of the pre-located speaker prior to communicating with the pre-located speaker using the controller 102 so as to reap the benefits of the aquatic animal-attracting sounds 114.

Referring to FIGS. 2 through 5, an illustrative embodiment of the aquatic animal-attracting system 200 includes the controller 202 with multiple components, functional modules, and/or elements. Elements of FIGS. 2 through 5 that are analogous to elements in FIG. 1 have been shown by indexing the reference numerals by 100. The controller 202 may communicate with the submersible speaker 208. The controller 202 may include a storage 246 that stores one or more pre-recorded sounds 248. The storage 246 may be any device, or subcomponent, capable of storing data, including, but not limited to, random access memory (RAM), volatile or non-volatile storage, a hard, drive, flash memory, a rewritable optical disc, rewritable magnetic tape, USB storage, electronic analog or electronic digital media, etc. Each of the pre-recorded sounds 248 may also have any length (e.g., 1 second, 5 seconds, 2 minutes, etc.). Also, as described above, any of the pre-recorded sounds 248 may include tactile sound to facilitate the attraction of aquatic animals.

Figure 2:
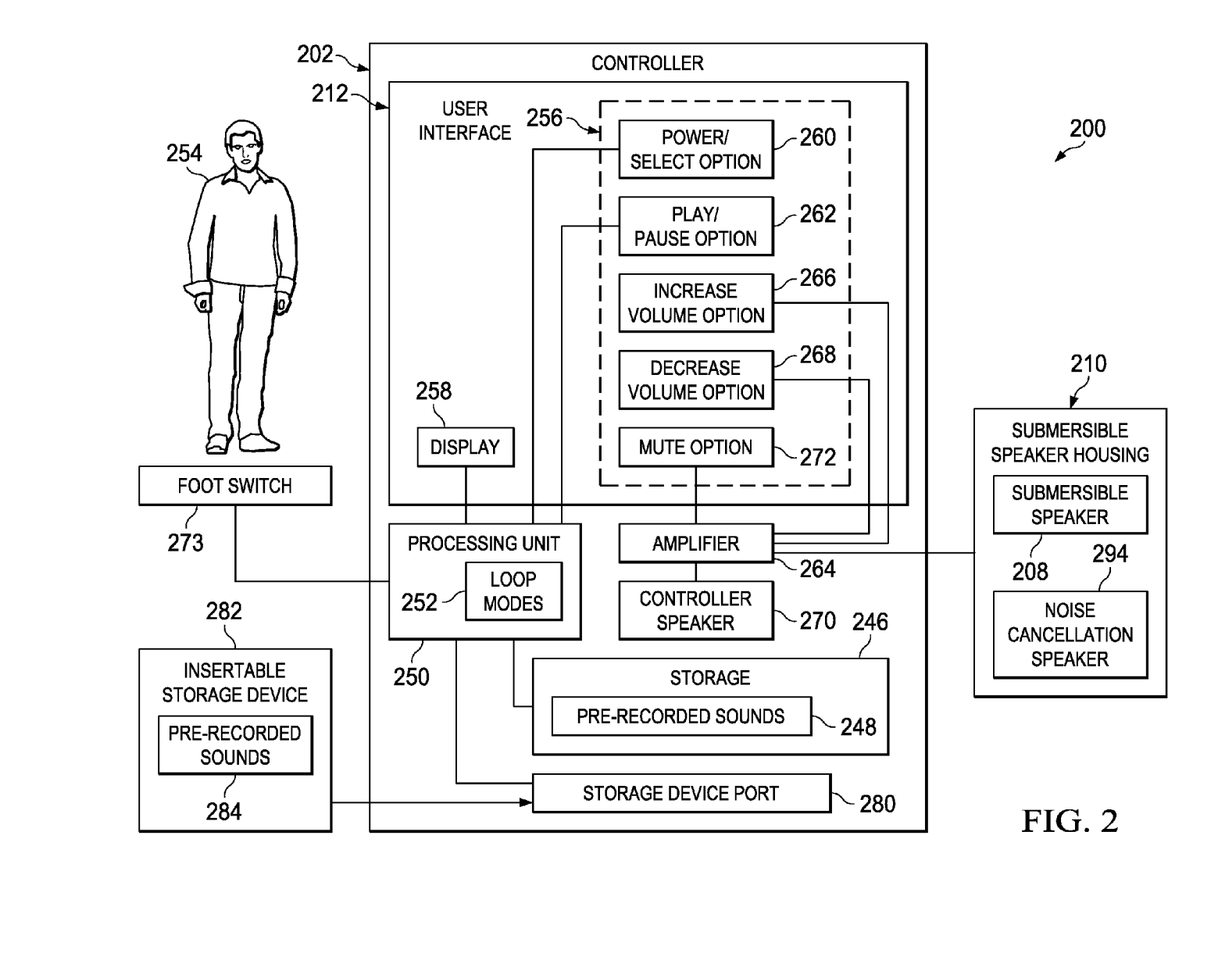
FIG. 2 is a schematic, block diagram of a system for attracting aquatic animals according to an illustrative embodiment.

The controller 202 may also include a processing unit 250 that may implement any of the various processes or functions of the controller 202, including the execution of instructions (e.g., software instructions, firmware instructions, user-selectable instructions, etc.). In one embodiment, the processing unit 250 may execute software instructions stored on the storage 246, or elsewhere, for implementing various functions or processes of the controller 202. In one embodiment, the processing unit 250 and the storage 246 may be included on the same, or one or more, printed circuit boards. The processing unit 250 may include one or more processors.

The processing unit 250 may implement one or more pre-determined or preprogrammed loop modes 252, which may be programmed or stored in, for example, a memory accessible by the processing unit 250, the storage 246, or elsewhere. The loop modes are modes in which any one or more of the pre-recorded sounds 248 may be played by the submersible speaker 208. Non-limiting examples of the loop modes 252 include a continuous loop mode, in which one or more of the pre-recorded sounds 248 may be continuously played with little or no delay between two successive occurrences of pre-recorded sound(s), or a delay loop mode, in which any one or more of the pre-recorded sounds 248 may be repeated and there is a predetermined delay (e.g., 30 seconds, 60 seconds, etc.) between two successive occurrences of pre-recorded sound(s) 248.

The controller 202 may include any number of loop modes 252. In one specific non-limiting example, the controller 202 may have a continuous loop mode, a 30 second delay loop mode, and a 60 second delay loop mode. However, the number of loop modes 252 and the predetermined delay, if any, associated with each loop mode 252 may vary. Also, each of the loop modes 252 may play one or more of the pre-recorded sounds 248 any number of times (e.g., 1 time, 6 times, 20 times, 100 times, etc.). By way of illustration, one of the loop modes 252 may continuously play one of the pre-recorded sounds 248 six (6) times. To provide another illustrative example, one of the loop modes 252 may play one or more of the pre-recorded sounds 248 twenty (20) times, with a 15 second delay between two successive occurrences of the one or more pre-recorded sounds 248. As illustrated by the non-limiting examples above, the attributes (e.g., delay between successive sounds, number of times to play sound, etc. may be varied; however, it will be appreciated that, in one embodiment, the loop modes 252 may be preprogrammed into the controller 202, thus sparing the user 254 the inconvenience of having to program the controller 202

In one embodiment, the pre-recorded, sounds 248 that are played by the submersible speaker 208, including the loop modes 252 in which, the pre-recorded sounds 248 may be played, may be managed or controlled by the user interface 212, which is operable by the user 254. The user interface 212 may include one or more user-selectable options 256 and a display 258. The user-selectable options 256 may be selectable by the user 254 to, among other things, cause the submersible speaker 208 to play one or more of the pre-recorded sounds 248 in one of the loop modes 252.

While selection of a pre-recorded sound 248 and a loop mode 252 may be performed using any combination of one or more of the user-selectable options 256, in one embodiment the pre-recorded sound 248 and the loop mode 252 may be selected using a power/select option 260. In one embodiment, the power/select option 260 may be selectable by the user 254 to switch the controller 202 on or off, change the pre-recorded sound 248 playable by the submersible speaker 208, change the loop mode 252 for playing the pre-recorded sound 248, or any combination thereof.

To illustrate one non-limiting example of how the power/select option 260 may be used to select the pre-recorded sound 248 and the loop mode 252, each time the user 254 selects the power/select option 260, a different pre-recorded sound/loop option combination may be identified by the controller 202 and/or displayed on the display 258. This identified or displayed pre-recorded sound/loop option combination may then be played by the submersible speaker 208 in response to the user 254 selecting a play/pause option 262.

Figure 4:
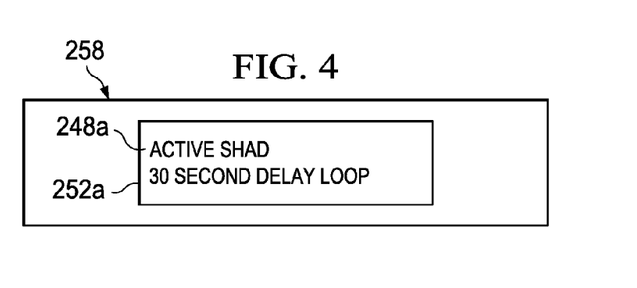
FIG. 4 is a schematic, pictorial representation of a display that may be included on the controller according to an illustrative embodiment.

In one embodiment, the controller 202 may incrementally scroll, one at a time, through the loop modes 252 for each of the pre-recorded sounds 248 each time the user 254 selects the power/select option 260. As the user 254 incrementally scrolls through the loop modes 252 for each of the pre-recorded sounds 248, a currently-identified loop mode 252 and pre-recorded sound 248 combination may be displayed on the display 258, as shown in FIG. 4. In FIG. 4, the pre-recorded sound 248a "ACTIVE SHAD" is currently identified to be played in the loop mode 252a "30 SECOND DELAY LOOP".

To provide another illustrative example of incremental scrolling, starting from the display 258 shown in FIG. 4, when the user 254 selects the power/select option 260 a first time, the loop mode 252a may change to a 60 second delay loop; when the user 254 selects the power/select option 260 a second time, the loop mode 252a may change to a continuous loop; when the user 254 selects the power/select option 260 a third time, the pre-recorded sound 248a may change to a different sound (e.g., a "prey being eaten" sound), and the loop mode 252a may be a 30 second delay loop; when the user 254 selects the power/select option 260 a fourth time, the loop mode 252a for the currently-identified pre-recorded sound 248a (e.g., a "prey being eaten" sound) may change to a 60 second delay loop; and so forth. In this manner, selection of the power/select option 260 may allow the user 254 to incrementally scroll through each of the loop modes 252 preprogrammed in the controller 202 for all or a portion of the pre-recorded sounds 248 recognized by the controller 202. To further illustrate a non-limiting example, each selection of the power/select option 260, or any other one of the user-selectable options 256, by the user 254 may incrementally scroll through different pre-recorded sound/loop option combinations in this or a similar order: (1) sound 1, loop mode 1, (2) sound 1, loop mode 2, . . . , (3) sound 1, loop mode N, (4) sound 2, loop mode 1, (5) sound 2, loop mode 2, . . . , (6) sound 2, loop mode N, . . . , (7) sound M, loop mode 1, (8) sound M, loop mode 2, . . . , (9) sound M, loop mode N, wherein N is the number of loop modes 252 and M is the number of pre-recorded sounds 248. Also, this order, as well as others, may be repeated any number of times. Other pre-recorded sound/loop option combinations may be scrolled, through in other embodiments, and in any order.

When the desired, pre-recorded sound 248 and loop mode 252 is displayed on the display 258, as determined by the user 254, the user 254 may select the play/pause option 262 to cause the displayed, or otherwise identified, pre-recorded sound 248 and loop mode 252 to be played by the submersible speaker 208. In one non-limiting embodiment, the pre-recorded sound 248 and the loop mode 252 to be played by the submersible speaker 208 may be selected using only a single option (e.g., the power/select option 260) on the user interface 212, thus providing a simplified user experience for selecting a desired pre-recorded sound 248 and loop mode 252.

In one embodiment, the power/select option 260 may also turn the controller 202 on or off. In this embodiment, assuming the controller 202 starts in an off state, the user 254 may select the power/select option 260 to turn on the controller 202. Then, the controller 202 may determine the pre-recorded sound 248 and the loop mode 252 to play based on the number of times the power/select option 260 is selected after the controller 202 is turned on; an example of such incremental scrolling or selection was provided above. Once the desired pre-recorded sound 248 and loop mode 252 has been identified or displayed by the controller 202, the user 254 may select the play/pause option 262 to play the identified or displayed pre-recorded sound 248 in the loop mode 252. At any time while the submersible speaker 208 is playing the identified pre-recorded sound 248, the user 254 may select the play/pause option 262 to pause the emission of the currently-playing pre-recorded sound 248. Once the user 254 is done using the aquatic animal-attracting system 200, the user 254 may select, or hold down, the power/select option 260 for a predetermined period of time (e.g., 3 seconds, 5 seconds, etc.) to turn off the controller 202.

It will be appreciated that, although the power/select option 260 may be used to both (1) switch the controller 202 on and off and (2) select the pre-recorded sound 248 and loop mode 252 to be played, these two separate functions may each be controlled by a separate respective option or button. Likewise, in one embodiment, the (1) play and (2) pause functions of the play/pause option 262 may each be controlled by a separate respective option or button. Indeed, any of the functions described in the illustrative embodiments may be selected or controlled using any number or combination of options or buttons.

In one embodiment, in response to the user selection of the play/pause option 262, the controller 202 may send a signal, such as an audio signal, instructions, control signal, or other data, to the submersible speaker 208 to play the pre-recorded sound 248 using the loop mode 252. The submersible speaker 208 may then emit the pre-recorded sound 248 and the loop mode 252 in response to receiving the signal.

In an illustrative embodiment, the controller 202 may include an amplifier 264 that may adjust or modify one or more attributes of the signal sent to the submersible speaker 208, thereby adjusting the pre-recorded sound emitted by the submersible speaker 208. For example, the amplifier 264 may increase the volume of the pre-recorded sound 248 through the submersible speaker 208 in response to the selection of an increase volume option 266 by the user 254. The amplifier 264 may also decrease the volume of the pre-recorded sound 248 through the submersible speaker 208 in response to selection of the decrease volume option 268 by the user 254. In another embodiment, the amplifier 264 may add tactile sound to any of the pre-recorded sounds 248 played by the submersible speaker 208; in this embodiment, the amplifier 264 may be adapted to operate or emit at tactile sound frequencies (e.g., 1-800 Hz). In yet another embodiment, however, any of the pre-recorded sounds 248 may be preprogrammed or pre-recorded to include tactile sound, without the need for tactile sound to be added in a separate process.

In one embodiment, the controller 202 may include a controller speaker 270, which may be mounted or coupled partially or fully inside the controller 202, or external to the controller 202. The controller speaker 270 may emit the same pre-recorded sound 248 being emitted by the submersible speaker 208, and at the same time, so that the user 254 can hear the pre-recorded sound 248 being emitted by the submersible speaker 208. In one embodiment, the user interface 212 may include one or more buttons allowing the user 254 to control the volume of the controller speaker 270. Indeed, in one embodiment, the increase volume option 266 and the decrease volume option 268 may be used to control the volume of the controller speaker 270. The user interface 212 may also include a mute option 272 that, when selected, mutes the controller speaker 270. The controller speaker 270 may then be unmuted by re-selecting to mute option 272.

Figure 3:
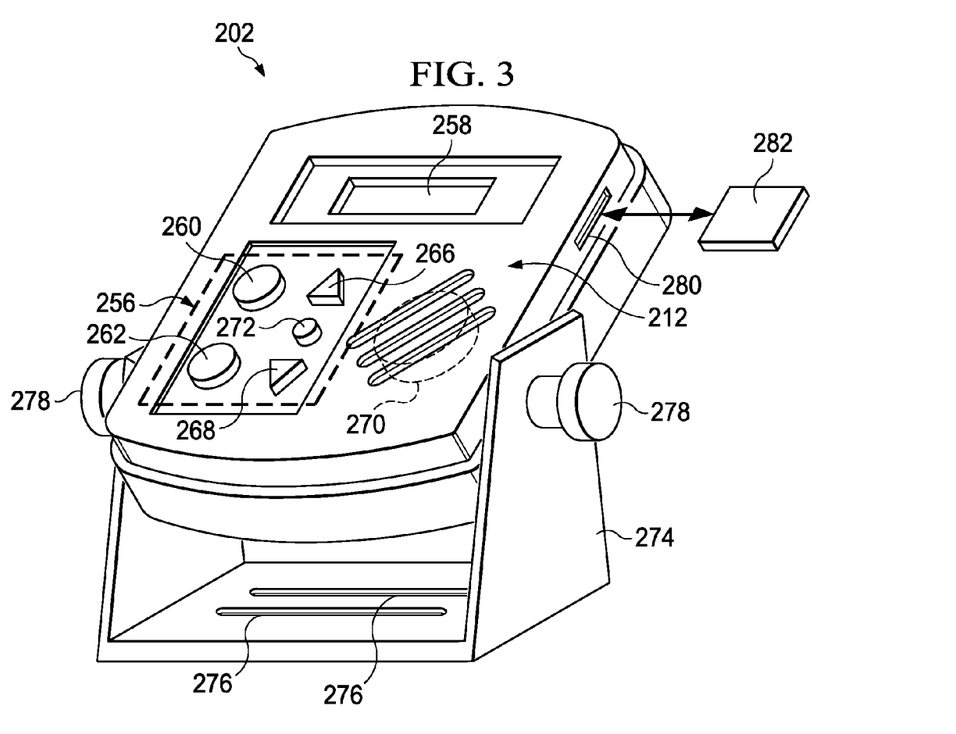
FIG. 3 is a schematic, perspective view of a controller according to an illustrative embodiment.

While the user-selectable options 256 are shown in FIG. 3 as being buttons, in another embodiment, the user interface 212 may include a touch screen and each of the user-selectable options 256 may be selectable using the touch screen. Also, although the user interface 212, and the controller 202 generally, may include any number of options or buttons, in one embodiment, the user interface 212 includes a maximum of five (5) user-selectable options or buttons to minimize the number of selectable options to be managed by the user 254.

The display 258 on the controller 202 may be any type of display, including, but not limited to, a liquid crystal display (LCD), an electronic ink display, an analog or mechanical display, etc. The display 258 may be capable of displaying any number of lines, and any number of characters per line (e.g., 2 lines and 20 characters per line). In one embodiment, the display 258 may also be capable of showing certain indicators, such as whether the pre-recorded sound 248 is being played by the submersible speaker 208, a volume indicator, a battery power indicator, etc. The display 258 may also include one or more display icons that indicate, for example, mute status, volume level, battery level, etc. Also, as shown in FIG. 4, the display 258 may display the current pre-recorded sound 248a and loop mode 252a combination that is identified, or is being played by the submersible speaker 208.

In one embodiment, a foot switch 273 may be in communication with, or coupled to, the controller 202. The foot switch 273, which may be selected by the user 254 by using his or her foot, may be used to toggle between playing and pausing the emission of the pre-recorded sound 248 by the submersible speaker 208 and/or the controller speaker 270. However, in other embodiments, the foot switch 273 may be used to function as any one or combination of the user-selectable options 256. In another embodiment, the foot switch 273, including any function thereof, may be controlled by the remote control 121 in FIG. 1, the mobile communication device application described in FIG. 1, or any other wireless transmitter. The foot switch 273 may be useful in the aquatic animal-attracting system 200 to provide ease of access for the user 254.

Referring to FIG. 3, the controller 202 may be mounted or coupled to an above-water portion of a boat in a number of different ways. In one non-limiting example, the controller 202 may be mounted to the above-water portion of the boat using a mounting bracket 274 that may be screwed, bolted, or otherwise connected to the boat using one or more slits or apertures 276. The mounting bracket 274 may include one or more knobs 278 that allow the user 254 to adjust the angle at which the controller 202 is oriented. In another embodiment, the controller 202 may be velcro'd, snapped, glued, etc. to an above-water portion of the boat. In another embodiment, the controller 202 may include one or more inserts or ports that allow for the controller 202 to be mounted to an above water portion of the boat using a RAM mount, a universal mounting bracket, a Gimbal mount, or any other type of mount. Indeed, other types of techniques or mounts may be used to couple the controller 202 to the boat, including none at all. In another embodiment, the controller 202 may be integrated the dash, steering wheel, dashboard instrument cluster, or other portion of the boat, including as described in the non-limiting examples of FIG. 1.

In one embodiment, the controller 202 may also include a storage device port 280. The storage device port 280 may be sized or adapted to receive any type of insertable storage device 282, and the insertable storage device 282 may include one or more pre-recorded sounds 284 that are playable by the controller 202 and the submersible speaker 208. The insertable storage device 282 may be any type of storage device, including an SD card, a universal serial bus (USB) memory, a special access or custom-readable device for any type of removable memory, including an SD card, any electronic analog or electronic digital media, or any other type of removable memory device. In the embodiment in which a custom-readable SD or other storage device is used, the controller 202 may include software that is adapted to read and/or play the pre-recorded sounds 284 on the customized device. Customization of the insertable storage device 282 in this manner may prevent the unauthorized sharing of the pre-recorded sounds 284. In another embodiment, however, the insertable storage device 282, and the pre-recorded sounds 284 stored thereon, may be universally compatible with different types of devices. The storage device port 280 may be located anywhere on the controller 202. Also, in one embodiment, the storage device port 280 may include a port or door cover, which may seal the storage device port 280.

In addition to, or in lieu of, those shown in FIG. 3, the controller 202 may have any number of connection ports to allow for communication with any number of other devices, including, but not limited to, the foot switch 273, the submersible speaker 208, additional speakers, etc. In one embodiment, the controller 202 may also include a wireless receiver or transmission unit so that the controller 202 may wirelessly communicate with other devices, including the submersible speaker 208, other speakers, the foot switch 273, the insertable storage device 282, etc. In one embodiment, the aquatic animal-attracting system 200 may communicate with, or display using, an auxiliary device usable on a boat or for fishing, such as a fish finder graph device, a GPS device, etc.

Figure 5:
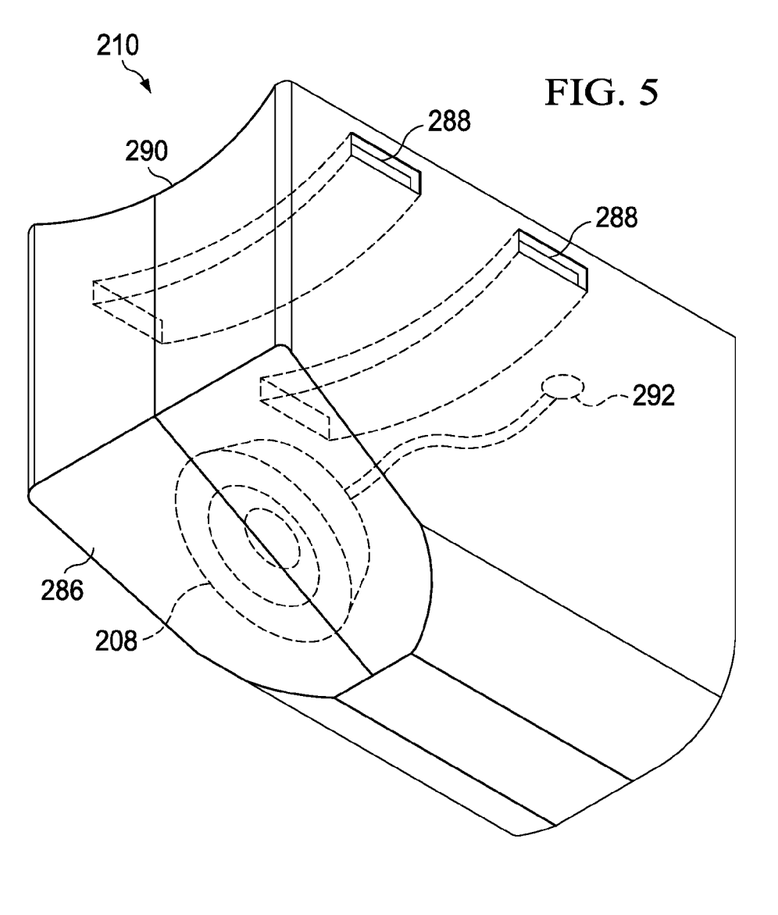
FIG. 5 is a schematic perspective view of a submersible speaker housing containing a speaker according to an illustrative embodiment.

Referring to FIG. 5, the submersible speaker housing 210 is shown as including an angled or indented portion 286 through which the speaker 208 may transmit the pre-recorded sound 248. Also, in one embodiment, the submersible speaker housing 210 may be a waterproof and/or plastic case, although the submersible speaker housing 210 may be constructed from any suitable material. In another embodiment, the speaker 208 may have a waterproof enclosure in addition to and/or separate from the submersible speaker housing 210. The submersible speaker housing 210 may also include a transformer, a circuit board, wiring, or any other devices or components usable to facilitate the operation of the one or more speakers 208 contained therein.

The submersible speaker housing 210 may also include one or more strap slots 288 that are adapted to receive a strap to couple the submersible speaker housing 210 to a portion of the boat (e.g., a trolling motor, a transom, etc.). The submersible speaker housing 210 may also include a curved surface 290 that may contour a curved component to which the submersible speaker housing 210 is coupled (e.g., the motor portion of a trolling motor). The submersible speaker housing 210 may also include a connection port 292 to facilitate communication between the speaker 208 and another device, such as the controller 202. The submersible speaker housing 210 may also include a noise cancellation speaker 294, which is shown in FIG. 2 and described in further detail in FIG. 6.

While FIG. 2 shows lines connecting elements within the aquatic animal-attracting system 200, it will be appreciated that elements within the controller 202, and indeed within the aquatic animal-attracting system 200, may intercommunicate in any manner.

Figure 6:
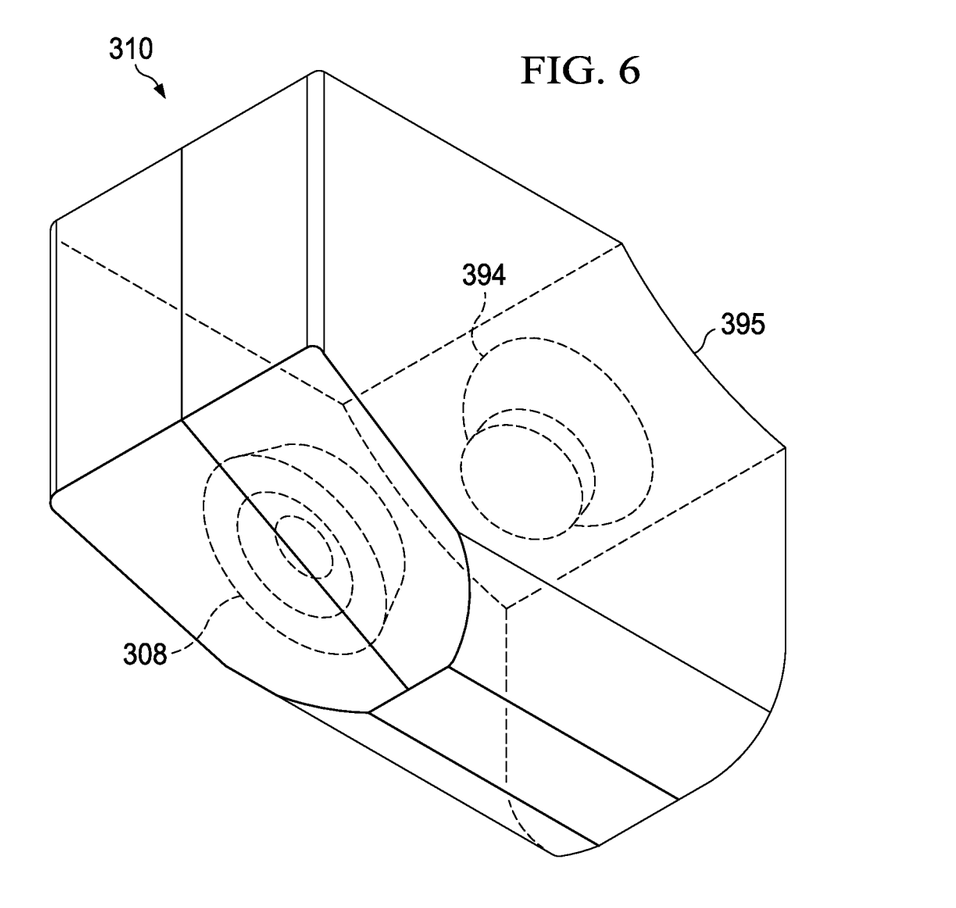
FIG. 6 is a schematic, perspective view of a submersible speaker housing containing a speaker and a noise cancellation speaker according to an illustrative embodiment.

Referring to FIG. 6, an illustrative embodiment of the submersible speaker housing 310 includes a noise cancellation speaker 394 that may be adapted to emit in an opposite, or different, direction than the submersible speaker 308. Elements of FIG. 6 that are analogous to elements in FIGS. 2 through 5 have been shown by indexing the reference numerals by 100. In one embodiment, the noise cancellation speaker 394 may emit a noise canceling sound toward a motor, such as the motor or propeller of a trolling motor, to interfere with a sound from the motor. However, the noise cancellation speaker 394 may interfere with any noise, including ambient noise or other noise other than the noise emitted from the speaker 308. The submersible speaker housing 310 may be constructed so that the noise cancellation speaker 394 is positioned to emit toward a noise source. In the non-limiting example of FIG. 6, the noise cancellation speaker 394 emits a noise cancellation sound through an angled portion 395 of the submersible speaker housing 310. However, the noise cancellation speaker 394 may emit through, or from, any surface of the submersible speaker housing 310. The noise cancellation speaker 394 may be used, e.g., to prevent noise from an extraneous source, such as a motor, from interfering with the sound intended to attract aquatic animals.

Figure 7:
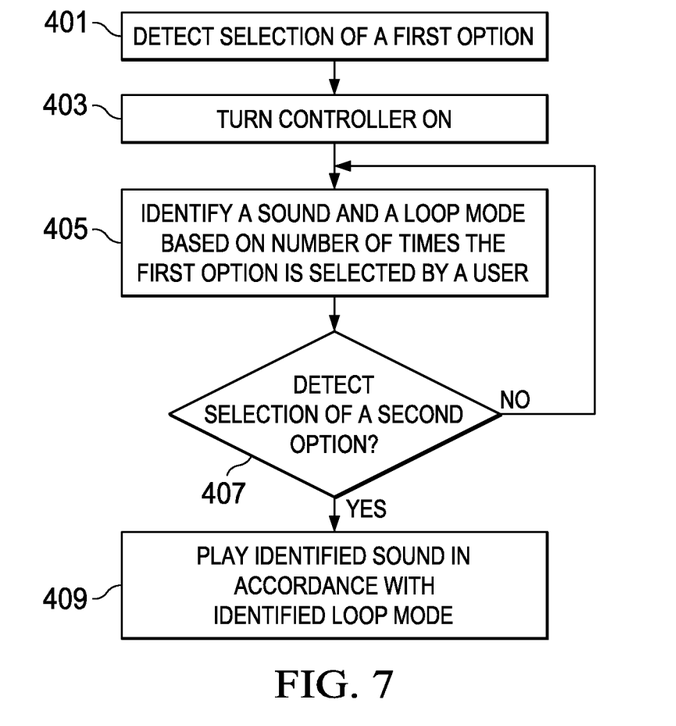
FIG. 7 is a flowchart of a process for attracting aquatic animals according to an illustrative embodiment.

Referring to FIG. 7, am illustrative embodiment of a process for attracting aquatic animals, which may be implemented by a controller, such as the controller 102 or 202 in FIGS. 1 or 2, includes detecting selection of a first option (step 401). In one embodiment, the first option may be a power/select option. The process may then turn the controller on (step 403). The process may identify a sound and a loop mode based on the number of times the first option is selected by a user (step 405).

The process may detect selection of a second option (step 407). If the process does not detect selection of the second option, the process may return to step 405. Returning to step 407, if the process detects selection of the second option, the process may play the identified sound in accordance with the identified loop mode (step 409). In one embodiment, the second option may be a play/pause option. At any point in the process described in FIG. 7, the volume may be increased or decreased by the user.

Figure 8:
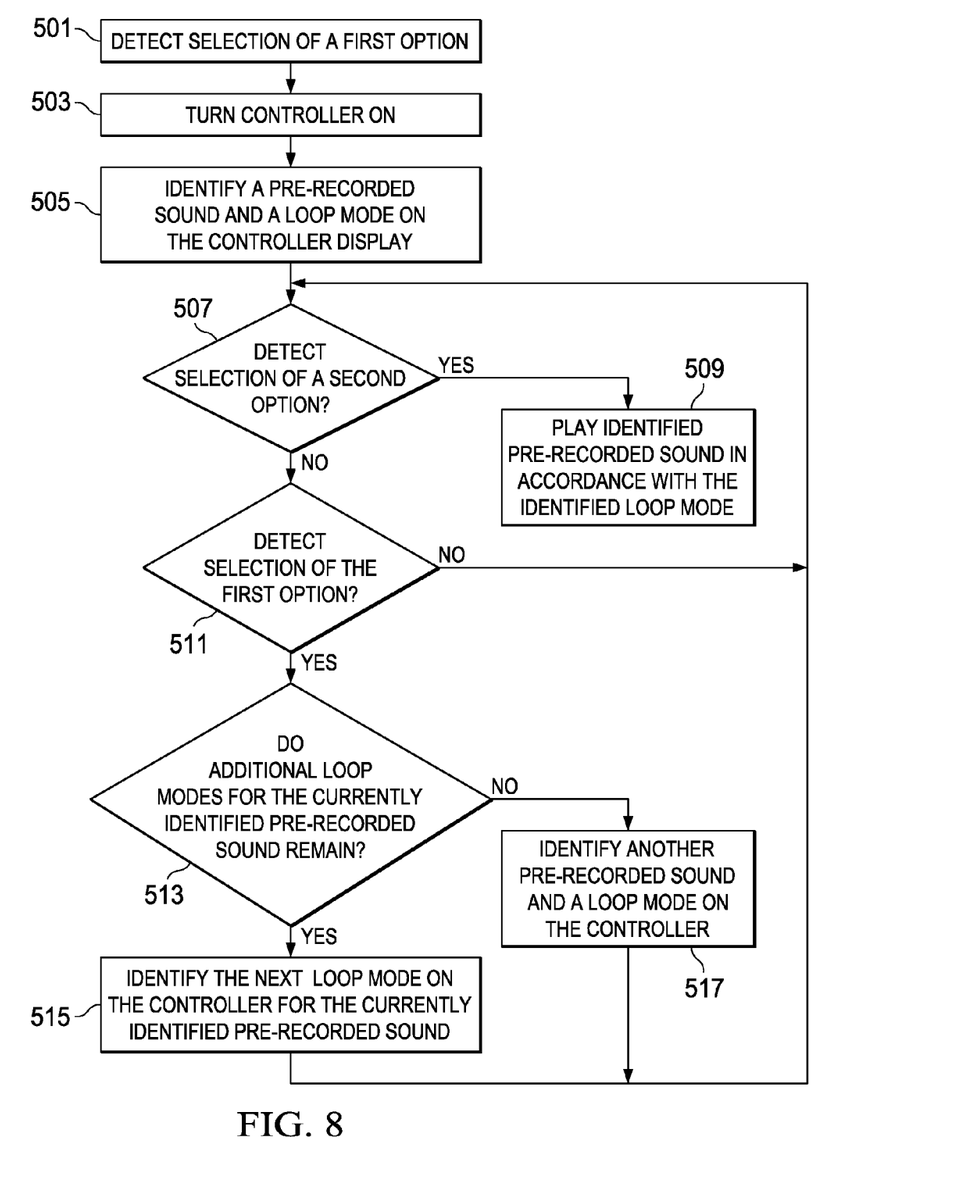
FIG. 8 is a flowchart of a process for attracting aquatic animals according to another illustrative embodiment.

Referring to FIG. 8, an illustrative embodiment of a process for attracting aquatic animals, which may be implemented by the controller 102 or 202 in FIGS. 1 or 2, includes detecting selection of a first option (step 501). In one embodiment, the first option may be any one of the user-selectable options 256 in FIG. 2, including the power/select option 260. The process may then turn the controller on (step 503). The process may identify a pre-recorded, sound, and a loop mode on the controller display (step 505). In one embodiment, an option, such as the first option, may be selected between steps 503 in 505.

The process they then detect selection of a second option (step 507). The second option may be any one of the user-selectable options 256 in FIG. 2, including the play/pause option 262. If the process detects selection of the second option, the process may play the identified pre-recorded sound in accordance with the identified loop mode (step 509). Returning to step 507, if the process does not detect selection of the second option, the process may determine whether selection of the first option is detected (step 511). If the process does not detect selection of the first option, the process may return to step 507. Returning to step 511, if the process detects selection of the first option, the process may determine whether additional loop modes for the currently-identified pre-recorded sound remain (step 513). If the process determines that additional loop modes for the currently-identified pre-recorded sound remain, the process may identify the next loop mode on the controller for the currently-identified pre-recorded sound (step 515). The process may then return to step 507.

Returning a step 513, if the process determines that additional loop modes for the currently-identified pre-recorded sound do not remain, the process may identify another pre-recorded sound and a loop mode on the controller (step 517). The process may then return to step 507.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. An apparatus for attracting aquatic animals, the apparatus comprising:
   a submersible speaker adapted to emit a pre-recorded sound for attracting an aquatic animal, the pre-recorded sound comprising tactile sound;
   a controller in communication with the submersible speaker, the controller adapted to be coupled to an above-water portion of a boat, the controller comprising:
   a user interface comprising one or more user-selectable options, wherein the one or more user-selectable options comprises a power/select option input selectable to (1) switch the controller between a turned on state and a turned off state, and (2) change the pre-recorded sound playable by the submersible speaker, wherein the power/select option input comprises a single button;
   wherein the controller is adapted to send a signal to the submersible speaker in response to detecting a selection of one of the user-selectable options; and
   wherein the submersible speaker emits the pre-recorded sound in response to receiving the signal.

2. The apparatus of claim 1, wherein the submersible speaker comprises a tactile sound transducer.

3. The apparatus of claim 1, wherein the controller comprises one or more pre-recorded sounds playable in a plurality of pre-determined loop modes, the power/select option input further selectable to play one of the pre-recorded sounds in one of the plurality of pre-determined loop modes using the submersible speaker.

4. The apparatus of claim 1, wherein the controller comprises a plurality of pre-recorded sounds playable in a plurality of pre-determined loop modes;

wherein one of the plurality of pre-recorded sounds and one of the plurality of pre-determined loop modes is selectable using only the power/select option input; and wherein the controller sends the signal to the submersible speaker to play the one of the plurality of pre-recorded sounds in the one of the plurality of pre-determined loop modes when a play/pause button on the user interface is selected.

5. The apparatus of claim 1, wherein the controller comprises one or more pre-recorded sounds playable in a plurality of pre-determined loop modes, wherein the controller incrementally scrolls through the plurality of pre-determined loop modes for each of the one or more pre-recorded sounds each time selection of the power/select option on the user interface is detected, the apparatus further comprising:

a display to display a currently-identified pre-recorded sound and a currently-identified pre-determined loop mode, the submersible speaker to play the currently-identified pre-recorded sound in the currently-identified pre-determined loop mode when a play/pause option is selected.

6. The apparatus of claim 1, wherein the one or more user-selectable options further comprises a play/pause option, an increase volume option, a decrease volume option, and a mute option.

7. The apparatus of claim 1, wherein the controller further comprises:

an amplifier to adjust one or more attributes of the pre-recorded sound emitted by the submersible speaker.

8. The apparatus of claim 1, wherein each of the one or more user-selectable options is a user-selectable button, and wherein the user interface comprises a maximum of five user-selectable buttons.

9. The apparatus of claim 1, further comprising:

a submersible speaker housing to contain the submersible speaker; and a noise cancellation speaker housed by the submersible speaker housing, the noise cancellation speaker operable to emit a noise-cancelling sound.

10. The apparatus of claim 1, further comprising:

a submersible speaker housing to contain the submersible speaker, wherein the submersible speaker housing is adapted to be coupled to a submersible portion of the boat.

11. The apparatus of claim 1, further comprising:

a submersible speaker housing to contain the submersible speaker, wherein the submersible speaker housing is adapted to be coupled to a submersible portion of a trolling motor.

12. The apparatus of claim 11, wherein the submersible speaker housing comprises one or more strap slots, each strap slot adapted to receive a strap, the submersible speaker housing adapted to be coupled to the submersible portion of the trolling motor using one or more straps.

13. The apparatus of claim 1, wherein the controller further comprises:

a controller speaker to emit the pre-recorded sound emitted by the submersible speaker.

14. The apparatus of claim 1, further comprising:

a foot switch in communication with the controller, the foot switch operable to toggle between playing and pausing the emission of the pre-recorded sound by the submersible speaker.

15. The apparatus of claim 1, wherein the controller further comprises:

a storage device port adapted to receive an insertable storage device, the insertable storage device comprising one or more pre-recorded sounds playable by the apparatus.

16. The apparatus of claim 1, further comprising:

a remote control in wireless communication with the controller.

17. An apparatus for attracting aquatic animals, the apparatus comprising:

a submersible speaker housing;

a submersible speaker housed within the submersible speaker housing, the submersible speaker adapted to emit a pre-recorded sound for attracting an aquatic animal; and a controller in communication with the submersible speaker, the controller adapted to be coupled to an above-water portion of a boat, the controller comprising a plurality of pre-recorded sounds playable in a plurality of pre-determined loop modes, the controller comprising:

a user interface comprising one or more user-selectable options;

wherein the controller incrementally scrolls through a turned on state, a turned off state and the plurality of pre-determined loop modes for each of the plurality of pre-recorded sounds each time selection of a first option in the one or more user-selectable options is detected, wherein the first option is a single input;

wherein the controller is adapted to send a signal to the submersible speaker in response to detecting a selection of a second option in the one or more user-selectable options; and wherein the submersible speaker emits the pre-recorded sound in accordance with the identified pre-determined loop mode in response to receiving the signal.

18. A method for attracting aquatic animals, the method comprising:

turning on a controller in response to detecting a user selection of a first button;

determining a pre-recorded sound and a loop mode based on a number of times selection of the first button is detected, wherein a plurality of pre-recorded sounds is playable in a plurality of loop modes, and wherein determining the re-recorded sound and the loop mode based on the number of times selection of the first button is detected; and incrementally scrolling through the plurality of loop modes for each of the plurality of pre-recorded, sounds in response to each selection of the first button; and playing the determined pre-recorded sound in accordance with the determined loop mode in response to detecting user selection of a second button.

* * * * *